US012444822B2

(12) United States Patent
Maqbool

(10) Patent No.: US 12,444,822 B2
(45) Date of Patent: Oct. 14, 2025

(54) COAXIAL TRANSMISSION LINE TO MICRO-STRIP PACKAGE TRANSITION

(71) Applicant: AmpliTech, Inc., Bohemia, NY (US)

(72) Inventor: Fawad Maqbool, Bohemia, NY (US)

(73) Assignee: AmpliTech, Inc., Bohemia, NY (US)

( * ) Notice: Subject to any disclaimer, the term of this patent is extended or adjusted under 35 U.S.C. 154(b) by 236 days.

(21) Appl. No.: 18/112,048

(22) Filed: Feb. 21, 2023

(65) Prior Publication Data

US 2023/0268631 A1 Aug. 24, 2023

Related U.S. Application Data

(60) Provisional application No. 63/312,722, filed on Feb. 22, 2022.

(51) Int. Cl.
*H01P 5/08* (2006.01)

(52) U.S. Cl.
CPC .................................... *H01P 5/085* (2013.01)

(58) Field of Classification Search
CPC ....................................................... H01P 5/085
See application file for complete search history.

(56) References Cited

U.S. PATENT DOCUMENTS 4,280,112 A * 7/1981 Eisenhart ................ H01P 5/085 333/260
5,508,666 A * 4/1996 Nguyen .................. H01P 5/085 333/260
2007/0264872 A1* 11/2007 Kuroda .................. H01R 12/63 439/581
2010/0176896 A1* 7/2010 Payne .................... H01R 24/50 333/260
2014/0285279 A1* 9/2014 Kroening ................ H01P 1/383 333/1.1
2016/0020501 A1* 1/2016 Lindsey ................. B33Y 80/00 29/850

OTHER PUBLICATIONS https://en.wikipedia.org/wiki/Impedance_matching (Year: 2024).*
https://www.microwaves101.com/encyclopedias/matching-networks (Year: 2025).*
https://www.microwaves101.com/encyclopedias/smith-chart-basics (Year: 2025).*

* cited by examiner

*Primary Examiner* — Samuel S Outten
(74) *Attorney, Agent, or Firm* — Polsinelli LLP

(57) ABSTRACT

A method for coupling a coaxial transmission line with a micro-strip package transition is disclosed. The method includes offsetting a conductor from a center, of the coaxial transmission line. The offsetting the conductor concentrates a first electromagnetic field lines of the coaxial transmission line towards a single ground plane. Further, the method includes coupling the micro-strip along a length of the offset conductor, using a connector. The first electromagnetic field lines of the offset conductor flows into the micro-strip to transmit energy packets with least discontinuity, for smooth transition of energy packets, with less or minimal signal to noise ratio.

20 Claims, 7 Drawing Sheets

COAXIAL TRANSMISSION LINE TO MICRO-STRIP PACKAGE TRANSITION

CROSS-REFERENCE TO RELATED APPLICATIONS

The present patent application claims the priority benefit of U.S. Provisional Patent Application No. 63/312,722, titled "Coaxial Transmission Line to Micro-strip Package Transition" and filed Feb. 22, 2022, the disclosure of which is incorporated by reference herein in its entirety.

FIELD OF THE DISCLOSURE

The present disclosure generally relates to coaxial transmission lines used for transferring electromagnetic signals, and more particularly relates to a coaxial to micro-strip package transition and methods of reducing loss of energy in field lines during transmission between the coaxial and the micro-chip.

BACKGROUND

Coaxial cable is used as a transmission line for radio frequency signals and are widely recognized in feedlines for connecting transmitters and receivers to their antennas, computer network connections, digital audio, and distribution of cable television signals. Further, the coaxial cable or coaxial transmission lines are made of an inner or center conductor and an outer dielectric, sometimes referred to a shield or wall. Further, electrical signals are driven from the conductor. Beneficially, the coaxial transmission lines structure supports transfer of high frequencies lending towards its broad bandwidth properties.

A region between the inner conductor and the outer shield can be filed by one or more dielectrics, such as air or a vacuum. Further, Electromagnetic radiation is generally confined to this region inside the transmission line, sometimes referred to as shield effect. Thus, the transmission of energy in the transmission lines occurs through the center conductor, covered inside the outer shield or dielectric.

When signals are provided transmitted to an electronic circuit board from a coaxial cable energy is lost based on factors associated with how the coaxial cable is attached to the electronic circuit board. Because of this, new systems and methods are required to couple the coaxial transmission line with the micro-strip with least discontinuity in field lines and thereby reduce the signal to noise ratio and other losses which occur during energy transmission.

DETAILED DESCRIPTION

Figure 1:
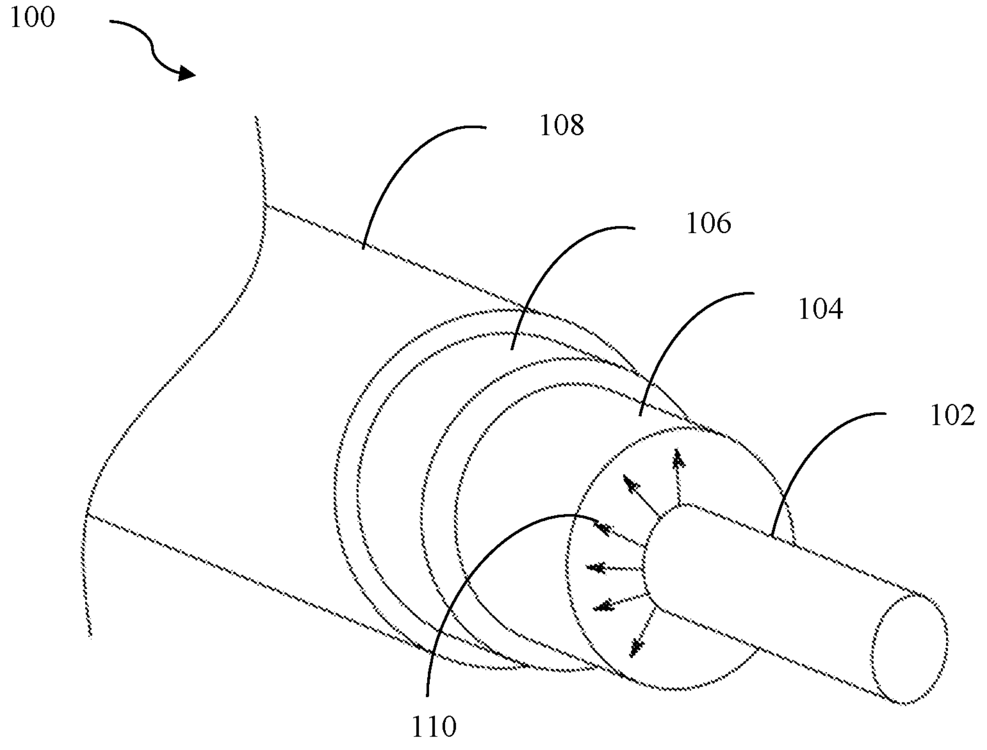
FIG. 1 illustrates a perspective view of a coaxial transmission line.

Broadband transmission lines to electronic circuit board transition is introduced for low loss of energy transmission. The broadband transmission line includes structures such as micro-strip, which is generally a flat electrical conductor separated from a ground plane by a dielectric layer, or can be a strip-line which is a generally flat electrical conductor sandwiched between two parallel ground planes separated by a dielectric layer, and other variations of printed circuit board (PCB) devices. Further, the micro-strip includes three layers, conducting strip, dielectric, and ground plane. The micro-strip can be used to design and fabricate radio frequency and microwave components such as directional coupler, power divider/combiner, filter, and antenna. In many devices the radio frequency is first carried out by the coaxial transmission lines and then transmitted to the micro-strip. However, during transmission, a lot of energy is wasted and signal to noise ratio also increases. As the radio frequency is shifted from coaxial transmission lines to the micro-strip the impedance also increases. Further, these losses occur because of the difference between field lines of the coaxial transmission lines with respect to the field lines of the micro-strip.

In some radio-frequency applications, for example, up to a few Gigahertz (GHz), field lines propagate primarily in a transverse electromagnetic (TEM) mode, with the electric and magnetic fields both substantially perpendicular to the direction of propagation, along a central axis. However, above a certain cutoff frequency, transverse electric and/or transverse magnetic higher order modes can also propagate, as in a hollow waveguide. Further, the shield effect in the coaxial transmission lines results from opposing currents between an outer surface of the center conductor and an inner surface of the shield, creating opposite magnetic fields that cancel, and thus do not radiate. In case of a circular coaxial transmission line, the electric field is radially symmetric about the center conductor. Further, the electric field lines diametrically opposed from each other would be 180 degrees out of phase with respect to each other. Further, in case of an open-ended coaxial transmission lines or cable, any radial portion of the electric field exposed to the open end would cancel with its opposing radial portion of the electric field, thus precluding the possibility of far-field radiation. Therefore, such features effectively prevent radiations from coaxial transmission lines, that contribute to their effectiveness as energy transfer media.

An N-way coaxial waveguide power divider/combiner can provide a low loss and compact power divider/combiner with high power efficiency. The power divider/combiner can be an N-way coaxial-cavity power divider/combiner with good characteristics of low loss and compact size. The power divider/combiner can be comprised of a coaxial common port, a radial-cavity, and N-way probe outputs. In various instances, the power divider/combiner can have a plurality of probe outputs that are equally spaced radially around an axis on which the coaxial common port is located. The radial-cavity and N-way probe outputs can be fabricated on a substrate board using printed circuit technology, such as a printed circuit board (PCB). In addition, the power divider/combiner can have reversed probe outputs which provide for 180 degrees out of phase outputs between the probe outputs. However, the transmission through the N-way coaxial-can be limiting due to a radial wavelength cavity as the transmission field lines of the coaxial 180 degrees out of phase outputs between the probe outputs.

FIG. 1 illustrates a perspective view of a coaxial transmission line 100. The coaxial transmission line 100 of FIG. 1 is consistent with the present disclosure and is described in conjunction with FIGS. 2-7. The coaxial transmission line 100 may also be referred as a coax or a coaxial cable. In some examples, the coaxial transmission line may have a subminiature version A (SMA) connector, a Radio Corporation of America (RCA) connector, a Very high frequency (VHF) connector, a Ultra high frequency (UHF) connector, an F connector, a Bayonet Neil-Concelman (BNC) connector, a threaded BNC connector (TNC), a 7/16 DIN connector, a General Radio 974 (GR874) connector, a GR900BT connector, a Type N connector, a C connector, an APC-7 connector, a 2.4 mm connector, a 1.0 mm connector, or another type of coaxial connector. The coaxial transmission line 100 may comprise a conductor (i.e. an inner conductor) 102, a dielectric 104, a shield 106, and an outer jacket 108. Further, the conductor 102 may be surrounded by the dielectric 104. In some examples, the conductor 102 may be made from a material selected form a group of materials such as, but not limited to, copper, silver, gold, or clad steel. Further, the conductor 102 may emit electromagnetic field lines 110 along a transverse direction of the conductor 102 (e.g., perpendicular or orthogonal to the side(s) of the conductor along the length of the conductor 102). Further, the dielectric 104 may be surrounded by the shield 106 and the shield 106 may be further surrounded by the outer jacket 108. The conductor 102 may be referred to as a center conductor. It can be noted that the dielectric 104 may act as an insulator or an insulating cover for the conductor 102. In one instance, the dielectric 104 may be made from polyethylene which may provide mechanical stability. The dielectric 104 may be made from a closed cell high density foam. In some examples, the dielectric 104 may include a glass dielectric. In some examples the dielectric 104 may include an air-based or gas-based dielectric 104.

Further, the shield 106 may be disposed over the dielectric 104 to act as a seal for prevention of signal leakage of electromagnetic fields from the coaxial transmission line 100. In one instance, the shield 106 may act as a Faraday cage to reduce electrical noise from affecting the signals, and to reduce electromagnetic field radiation that may interfere with nearby devices. In another instance, the shield 106 may minimize capacitive coupled noise from other electrical sources. The shield 106 may be grounded for enhancing performance of electromagnetic field transition. Further, in another example, the shield 106 may be electrically conductive to maximize efficiency of the coaxial transmission line 100. The shield 106 may be made from a material selected from a group of electrical conductive materials, without departing from the scope of the disclosure. The shield 106 may act as a return path for the signal, or may act as screen only.

An outer surface of the shield 106 may be kept at ground potential and a signal carrying voltage may be applied to the conductor 102. Further, the outer jacket 108 surrounded over the shield 106 and the overall coaxial transmission line 100 may simply provide environmental and mechanical protection. The outer jacket 108 may be made from a material or a combination of materials selected from a group of materials of polyvinyl chloride (PVC), fluorinated ethylene propylene (FEP), polytetrafluoroethylene (TPFE), polyethylene (PE), and other commonly available materials having high tensile strength, toughness, and flexibility.

Figure 2:
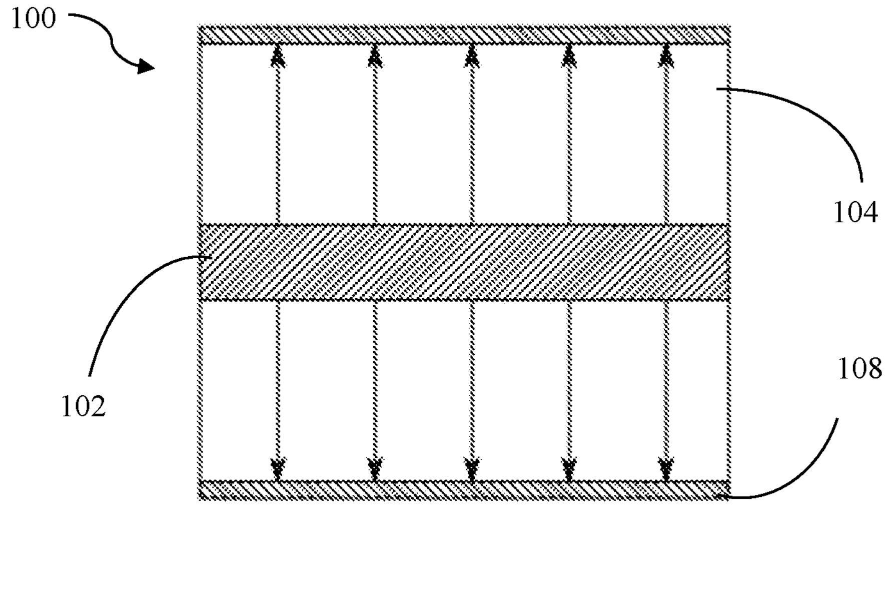
FIG. 2 illustrates a side view of the coaxial transmission line.
Figure 3:
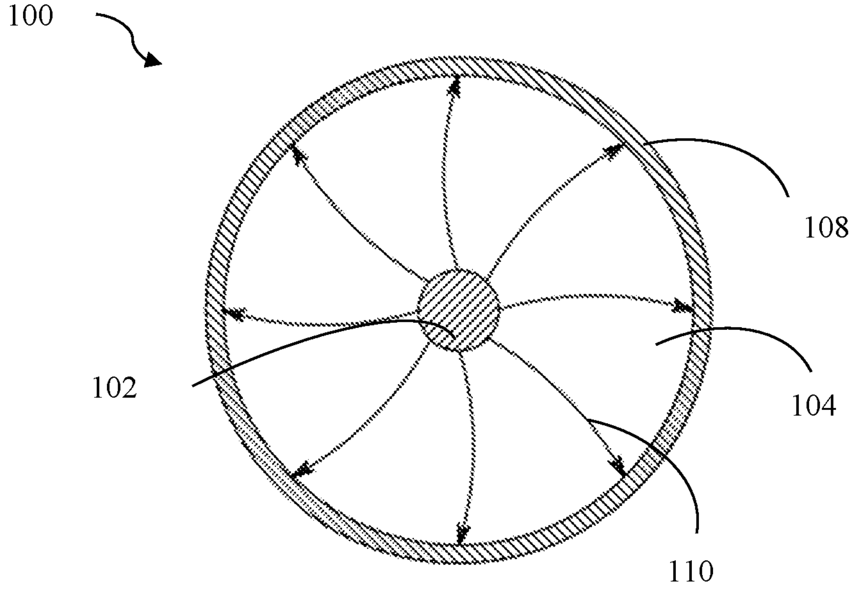
FIG. 3 illustrates a front view of the coaxial transmission line with the electromagnetic field lines in transverse direction.

FIG. 2 illustrates a side view of the coaxial transmission line 100. FIG. 3 illustrates a front view of the coaxial transmission line 100 with the electromagnetic field lines 110 in transverse direction. As shown in FIGS. 1-3, the coaxial transmission line 100 with the first electromagnetic field lines 110 may spread in every direction along the length of the coaxial transmission line 100. Therefore, there may be loss of energy while transmitting the signals from one end to an another end of the coaxial transmission line 100. This loss of energy may be referred to as insertion loss. To overcome this loss of energy, the first electromagnetic field lines 110 may be offset in one direction.

Figure 4:
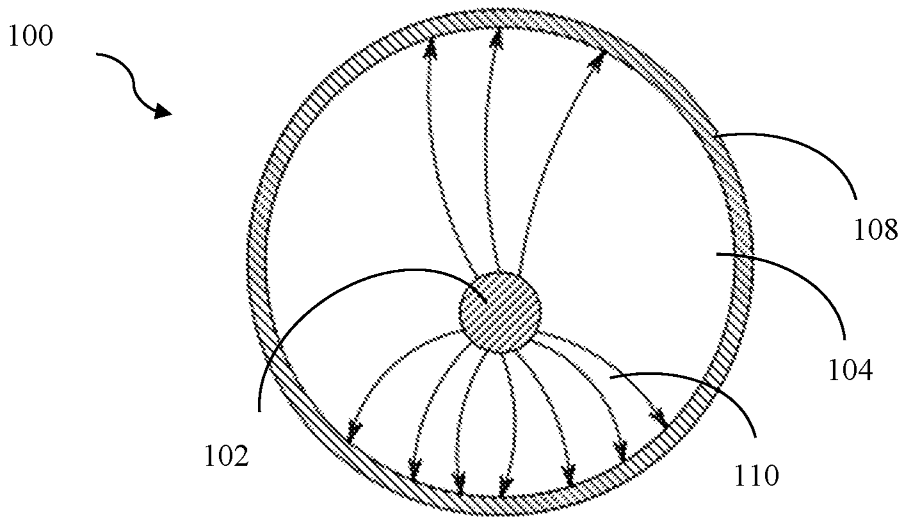
FIG. 4 illustrates a front view of the coaxial transmission line with the electromagnetic field lines offset from center.
Figure 5A:
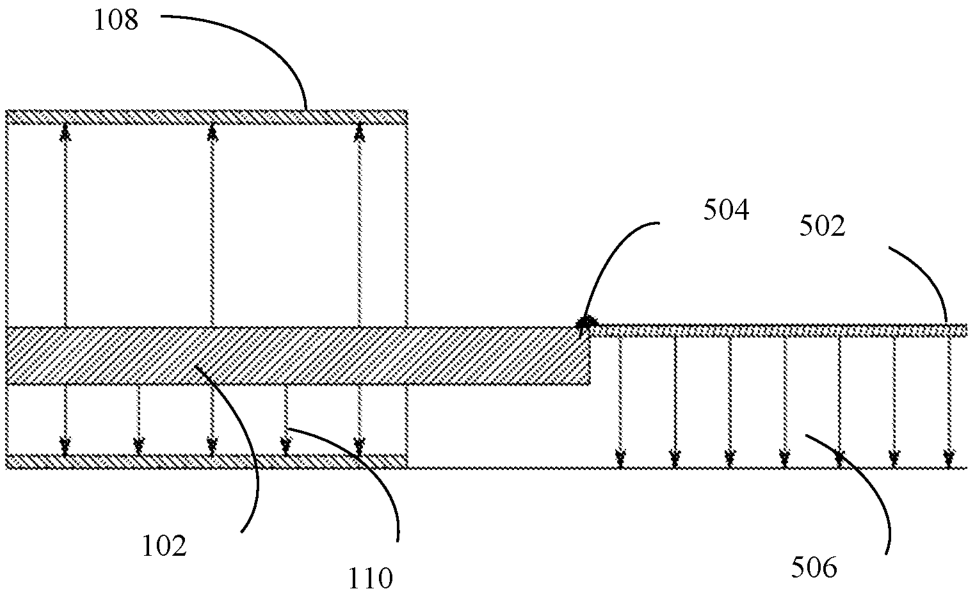
FIG. 5A illustrates a side view of the coaxial transmission line, with electromagnetic field lines offset from center, coupled with a micro-strip using a connector.

FIG. 4 illustrates a front view of the coaxial transmission line 100 with the electromagnetic field lines offset from center. The coaxial transmission line 100 may be given an offset feed to diverge the first electromagnetic field lines 110 in one direction, as shown in FIG. 4. FIG. 5A illustrates a side view of the coaxial transmission line 100, with electromagnetic field lines 110 offset from center, coupled with a micro-strip 502 using a connector 102. In another example, the first electromagnetic field lines 110 may be concentrated in one direction from the conductor 102, as shown in FIG. 2 and FIG. 5A. In some examples, by offsetting the conductor 102 in a specified direction (relative to the center of the coaxial transmission line 100), the first electromagnetic field lines 110 of the coaxial transmission line 100 (e.g., of the conductor 102) are concentrated in the specified direction that the conductor 102 is offset. In certain instances, most of the first electromagnetic field lines 110 emitting from the coaxial transmission line 100 may be offset from the conductor 102. In some examples, at least 99 percent of the first electromagnetic field lines 110 may be diverged towards a single ground plane. In some examples, the conductor 102 is offset in a specified direction (relative to the center of the coaxial transmission line 100) toward the ground plane. Further, the divergence of the first electromagnetic field lines 110 may provide a mechanism to couple the coaxial transmission line 100 with a micro-strip (e.g., micro-strip 502) to transmit signals at a minimal loss (e.g., minimal insertion loss) and/or minimal reflection (e.g., of electromagnetic field lines and/or signals).

Further, as shown in FIG. 5A, the coaxial transmission line 100 with the first electromagnetic field lines 110 offset from the conductor 102 may be coupled with a micro-strip 502. The micro-strip 502 may be a feed structure or a strip-line. The micro-strip 502 may be coupled to the coaxial transmission line 100 using a connector 504. The micro-strip 502 may be connected to the coaxial transmission line 100 along a length using the connector 504. The connector 504 may be made from a material selected from a group of electrically conductive materials, such as, but not limited to, copper, silver, gold, or clad steel. In some examples, the connector 504 may be a gold connector, such as a gold ribbon or gold wire connector. It can be noted that the connector 504 may be any connector, without departing from the scope of the disclosure. In another instance, the micro-strip 502 may have second electromagnetic field lines 506 spread in one direction only. Further, the connection between the coaxial transmission line 100 and the micro-strip 502 may be designed in so that the conductor 102 may be 102. Further, the conductor 102 may be connected at one end of the micro-strip 502 via the connector 504. Use of the connector 504 for connecting the coaxial transmission line 100 with the micro-strip 502 as described above with the offset conductor 102 may provide an enhanced transmission of energy with reduced reflection, reduced insertion loss, and/or reduced or minimal signal to noise ratio compared to a transition from a coaxial transmission line 100 where the conductor 102 is centered to a micro-strip. For instance, the offset of the conductor 102 can help arrange the first electromagnetic field lines 110 go into the micro-strip 502 (transition to the second electromagnetic field lines 506) rather than being reflected back and/or going into the air (e.g., at a discontinuity). Reduced insertion loss can ultimately convey additional power to the micro-strip 502 that might otherwise be lost. Reduced signal to noise ratio can reduce noise in situations where the micro-strip 502 is coupled to antennae or other devices (e.g., low-noise technologies, microwave systems) that are sensitive to noise, for instance where noise can cause issues. For instance, discontinuities and/or reflected signals can cause gain ripple, which can cause issues in various electrical parameters. A smooth transition as discussed herein can prevent gain ripple and the issues that are further caused by gain ripple.

In some examples, a first length of the coaxial transmission line 100 (that is farther from the micro-strip 502) may have a first configuration in which the connector 102 is centered in the coaxial transmission line 100. A second length of the coaxial transmission line 100 (that is closer to the micro-strip 502) may have a second configuration in which the connector 102 is offset from the center of the coaxial transmission line 100 as discussed herein. The coaxial transmission line 100 may transition from the first configuration to the second configuration as the coaxial transmission line 100 approaches the connector 504 to the micro-strip 502, and may thus more smoothly transition from the first electromagnetic field lines 110 of the first electromagnetic field of the coaxial transmission line 100 (e.g., of the electromagnetic field of the conductor 102) to the second electromagnetic field lines 506 of the second electromagnetic field of the micro-strip 502. This transition from the first configuration to the second configuration within the coaxial transmission line 100 can be smooth and/or gradual to prevent discontinuities. The coaxial transmission line 100 can be arranged, designed, and/or configured so that this transition from the first configuration to the second configuration within the coaxial transmission line 100 occurs a predetermined distance from an end of the coaxial transmission line 100 (e.g., the predetermined distance from the connector 504 and/or another connector of the coaxial transmission line 100). In some examples, the coaxial transmission line 100 may transition from a circular cable structure to a semicircular (e.g., a half-circle or half-moon) cable structure shape as the coaxial transmission line 100 transitions from the first configuration (with the centered conductor 102) to the second configuration (with the offset conductor 102). In some examples, the coaxial transmission line 100 may transition from a first dielectric material for the dielectric 104 (e.g., glass) to a second dielectric material for the dielectric 104 (e.g., air) as the coaxial transmission line 100 transitions from the first configuration (with the centered conductor 102) to the second configuration (with the offset conductor 102), for instance to shrink the gap between the conductor 102 and the shield 106, which can further focus the energy (e.g., in the conductor 102 and/or of the first electromagnetic field lines 110) toward the micro-strip 502.

Figure 5B:
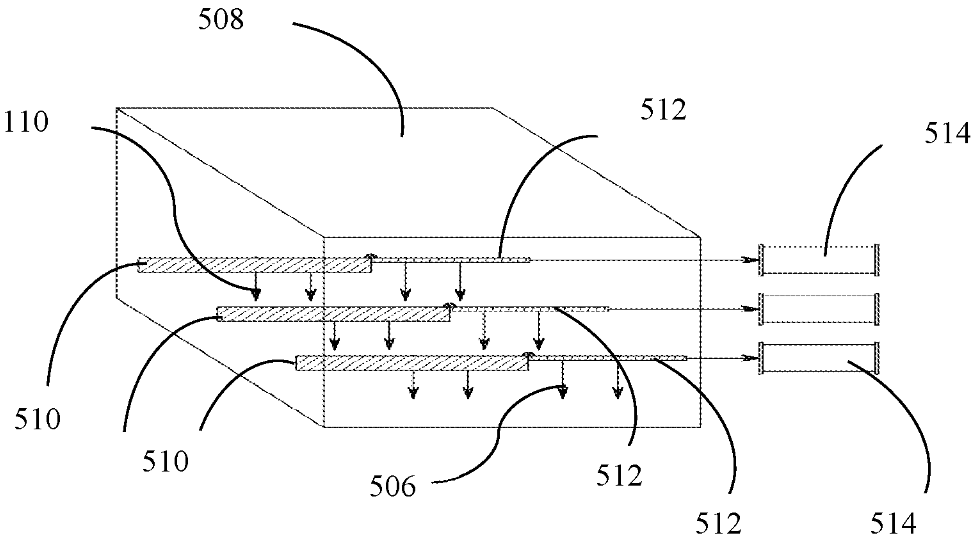
FIG. 5B illustrates a plurality of coaxial transmission lines and a plurality of micro-strips coupled to each other.
Figure 6:
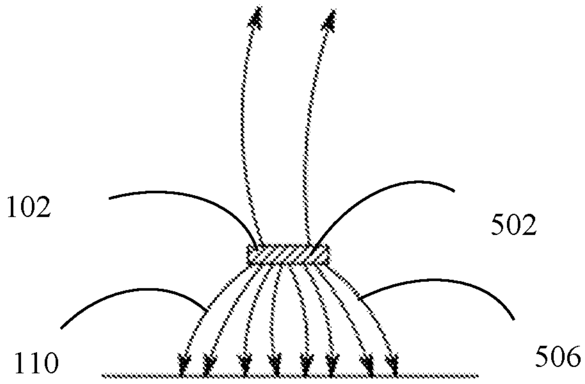
FIG. 6 illustrates a front view of the offset coaxial transmission line coupled with the micro-strip.

FIG. 5B illustrates a plurality of coaxial transmission lines 510 and a plurality of micro-strips 512 coupled to each other. FIG. 6 illustrates a front view of the offset coaxial transmission line 100 coupled with the micro-strip 502. The first electromagnetic field lines 110 of the coaxial transmission line 100 (e.g., of the connector 102) may flow with the second electromagnetic field lines 506 of the micro-strip 502, as shown in FIG. 5A and FIG. 6. Further, the first electromagnetic field lines 110 of the coaxial transmission line 100 may be concentrated below the conductor 102 in order to flow into the micro-strip 502. Further, the first electromagnetic field lines 110 of the coaxial transmission line 100 and the second electromagnetic field lines 506 of the micro-strip 502 may terminate on a ground plane. By offsetting the conductor 102 to be closer to the ground plane, the first electromagnetic field lines 110 can simulate the second magnetic field lines 506 of the micro-strip 502, for instance as seen in FIGS. 5A, 5B, and 6. The first electromagnetic field lines 110 offset from the conductor 102 of the coaxial transmission line 100 may flow into the micro-strip 502 with reduced discontinuity (and improved continuity) compared to a coaxial transmission line 100 where the conductor 102 is centered. It can be noted that the connection between the coaxial transmission line 100 and the micro-strip 502 may provide a smooth transition of signals to an external device with reduced or minimal signal to noise ratio compared to the signal-to-noise ration for a coaxial transmission line 100 where the conductor 102 is centered. The first electromagnetic field lines 110 of the coaxial transmission line 100 and the second electromagnetic field lines 506 of the micro-strip 502 may flow in a same ground plane with less discontinuity, and thereby lower loss of transmission (e.g., lower insertion loss), compared to a coaxial transmission line 100 where the conductor 102 is centered.

In one instance, a mechanical jig (not shown) may be used to hold the coaxial transmission line 100 while coupling with the micro-strip 502. In certain instances, the mechanical jig may be used to glue or fix the coaxial transmission line 100 in place with the conductor 102 exposed. In an illustrative example, the conductor 102 may be exposed by ⅛th of an inch. Further, the mechanical jig may be used to mount the micro-strip 502 at one side of the coaxial transmission line 100. In one instance, the mechanical jig may be set up in a manner to expose a ground plane of and a top plane of the micro-strip 502. Further, the mechanical jig may be arranged over the micro-strip 502 in a manner that the ground plane of the micro-strip 502 follows the ground plane of the mechanical jig. In one instance, distance between the mechanical jig ground plane and a first side of the micro-strip 502 may be 0.5 inch. In another instance, a top side of the exposed conductor 102 of the coaxial transmission line 100 may be placed slightly underneath the first side of the micro-strip 502 and the bottom on the ground plane. The first side of the micro-strip 502 may be a top side of the micro-strip 502. Such a mechanical jig provides a connection between the coaxial transmission line 100 and the micro-strip 502.

Referring to FIG. 5B, a connection box 508 with a plurality of coaxial transmission lines 510 coupled with a plurality of micro-strips 512, is illustrated. Further, each micro-strip of the plurality of micro-strips 512 may be further connected to (and/or coupled to) a low noise amplifier (LNA) 514. Each coaxial transmission line 510 may be coupled with each micro-strip 512 using the connector 504, as shown in FIG. 5B. In some examples, the plurality of micro-strips 512 can be coupled to one or more of the LNA 514, an antenna, a receiver, a transmitter, a transceiver, a directional coupler, a power divider, a power combiner, a filter, a transistor, a matching circuit, a printed circuit board (PCB), a transformer, a voltage converter, a resistor, a capacitor, an inductor, or a combination thereof. In some examples, the plurality of micro-strips 512 may be coupled to microwave hardware, for instance in a 50 ohm impedance environment or a 75 ohm impedance environment. The first electromagnetic field lines 110 and the second electromagnetic field lines 506 of the plurality of coaxial transmission lines 510 and the plurality of micro-strips 512 may be diverged along the single ground plane. The first electromagnetic filed lines 110 of each coaxial transmission line 510 may be concentrated to flow into each micro-strip 512 of the plurality of micro-strips 512. In an example, each micro-strip 512 may be connected to each coaxial transmission line 510 at one end using a gold ribbon or a gold wire connector. Further, each micro-strip 512 may be further connected to the LNA 514 via an output wire connection. The LNA 514 may be connected directly to each micro-strip 512, to reduce signal to noise ratio.

Each coaxial transmission line 510 may be referred to as a first conductor and each micro-strip 512 may be referred as a second conductor. The connection box 508 may be provided to remove entanglement of the plurality of coaxial transmission lines 510 during coupling with the plurality of micro-strips 512 and thus reduces signal to noise ratio during transmission of energy towards the LNA 514. The LNA 514 may include a substrate, a plurality of capacitors and resistors, and discrete wire, packed within an enclosure. The connection box 508 may be provided to enhance the capacity of transmitting data packets with more frequency. The connection between the plurality of coaxial transmission lines 510 and the plurality of micro-strips 512 may provide a transmission with reduced or minimal signal to noise ratio.

Figure 7:
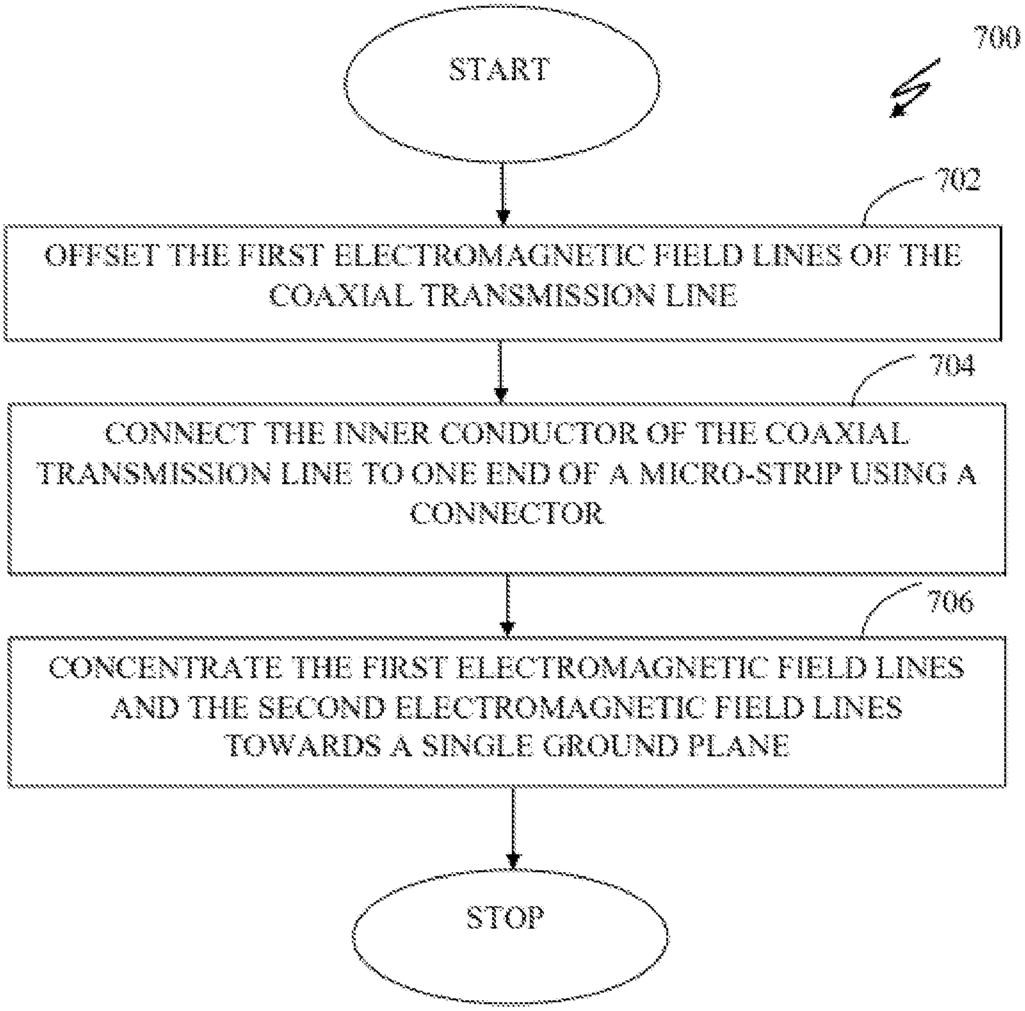
FIG. 7 illustrates a flow diagram for a process of connection between the coaxial transmission line and the micro-strip.

FIG. 7 illustrates a flow diagram for a process 700 of connection between the coaxial transmission line 100 and the micro-strip 502. The process 700 of connecting the coaxial transmission line 100 and the micro-strip 502 is described in conjunction with FIGS. 1-4, 5A-5B, and 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

At operation 702, the first electromagnetic field lines 110 of the coaxial transmission line 100 (e.g., of the conductor 102) may be offset from the conductor 102, for instance by offsetting the conductor 102 from the center of the coaxial transmission line 100. The first electromagnetic field lines 110 may be diverged from different directional planes and concentrated on a single ground plane. At operation 704, the conductor 102 of the coaxial transmission line 100 may be coupled to one end of the micro-strip 502 using the connector 504. The coaxial transmission line 100 and the micro-strip 502 may be connected using the connector 504. The connector 504 may be a gold connector, such as a gold ribbon or a gold wire connector. In one embodiment, the second electromagnetic field lines 506 of the micro-strip 502 may flow in a unidirectional or a single ground plane. Further, at operation 706, the first electromagnetic field lines 110 of the coaxial transmission line 100 and the second electromagnetic field lines 506 of the micro-strip 502 may be concentrated towards a single ground plane. The flow of the first electromagnetic field lines 110 of the coaxial transmission line 100 and the second electromagnetic field lines 506 of the micro-strip 502, may reduce the loss of energy during transmission. The signal to noise ratio may be reduced, as the field lines flow unidirectional along the single ground plane. The reduction of the signal to noise ratio may be caused, at least in part by an increase of flux density below connector 504 (e.g., in the direction that the conductor 102 is offset) which then proceeds to the micro-strip 502.

Figure 8:
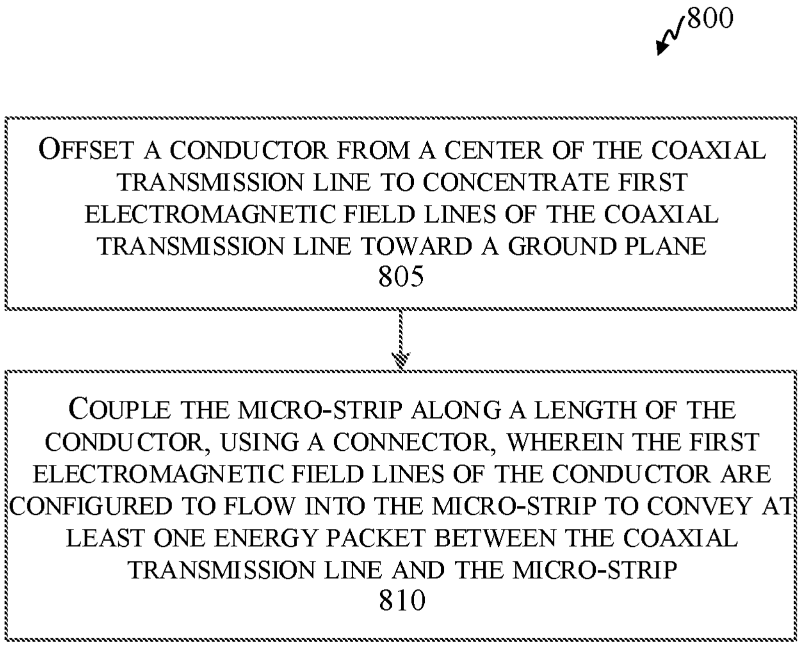
FIG. 8 illustrates a flow diagram for a process of connection between the coaxial transmission line and the micro-strip.

FIG. 8 illustrates a flow diagram for a process 800 of connection between the coaxial transmission line 100 and the micro-strip 502. The process 800 of connecting the coaxial transmission line 100 and the micro-strip 502 is described in conjunction with FIGS. 1-4, 5A-5B, and 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

At operation 805, a system offsets a conductor 102 from a center of the coaxial transmission line 1000 to concentrate first electromagnetic field lines 110 of the coaxial transmission line 100 toward a ground plane. At operation 810, the system couples the micro-strip 502 along a length of the conductor 102, using a connector 504, wherein the first electromagnetic field lines 110 of the conductor are configured to flow into the micro-strip 502 to convey at least one energy packet between the coaxial transmission line 100 and the micro-strip 502.

The operations of the process 700 and/or the process 800 can be overlapped, can be combined with one another and/or with additional operations, and/or can be rearranged. In some examples, the connector 504 is a gold connector. In some examples, the conductor 102 is offset from the center of the coaxial transmission line 100 toward the ground plane. In some examples, the first electromagnetic field lines 110 of the coaxial transmission line 100 are configured to simulate second electromagnetic field lines 506 of the micro-strip 502 based on the conductor 102 being offset from the center of the coaxial transmission line 100.

In some examples, the conductor 102 is offset from the center of the coaxial transmission line 100 in a specified direction, the first electromagnetic field lines 110 of the coaxial transmission line 100 are concentrated in the specified direction, and the second electromagnetic field lines 506 of the micro-strip 502 are concentrated in the specified direction.

In some examples, the conductor 102 is at the center of the coaxial transmission line 100 (e.g., as in FIG. 3) in a first configuration, and the conductor 102 is offset from the center of the coaxial transmission line 100 (e.g., as in FIG. 4) in a second configuration. The coaxial transmission line 100 transitions from the first configuration to the second configuration as the coaxial transmission line 100 approaches the connector 504 to the micro-strip 502. In some examples, the coaxial transmission line 100 includes a first length (or first portion) and a second length (or second portion). The first length uses the first configuration and is farther from the connector 504 and/or the micro-strip 502 than the second length. The second length uses the second configuration and is closer to the connector 504 and/or the micro-strip 502 than the first length.

In some examples, the coaxial transmission line 100 uses a first dielectric material for the dielectric 104 (e.g., glass) in a first configuration, and the coaxial transmission line 100 uses a second dielectric material for the dielectric 104 (e.g., air) in a second configuration, The coaxial transmission line 100 transitions from the first configuration to the second configuration as the coaxial transmission line 100 approaches the connector 504 to the micro-strip 502. In some examples, the coaxial transmission line 100 includes a first length (or first portion) and a second length (or second portion). The first length uses the first configuration and is farther from the connector 504 and/or the micro-strip 502 than the second length. The second length uses the second configuration and is closer to the connector 504 and/or the micro-strip 502 than the first length.

In some examples, the coaxial transmission line 100 has a circular shape (e.g., as in FIG. 3 or FIG. 4) in a first configuration, and the coaxial transmission line 100 has a semicircular shape (or half-circle shape, or half-moon shape) in a second configuration. For instance, in the second configuration, the coaxial transmission line 100 can include the bottom half-circle of the circular coaxial transmission line 100 of FIG. 4, with the outer jacket 108 substantially flattened at the top of the circle instead of round as illustrated in FIG. 4. The coaxial transmission line 100 transitions from the first configuration to the second configuration as the coaxial transmission line 100 approaches the connector 504 to the micro-strip 502. In some examples, the coaxial transmission line 100 includes a first length (or first portion) and a second length (or second portion). The first length uses the first configuration and is farther from the connector 504 and/or the micro-strip 502 than the second length. The second length uses the second configuration and is closer to the connector 504 and/or the micro-strip 502 than the first length.

In some examples, each of the various second configurations discussed above (e.g., the conductor 102 being offset from the center of the coaxial transmission line 100 where the connector 504 couples the conductor 102 to the micro-strip 502, the change in dielectric material, the change in shape of the coaxial transmission line, or a combination thereof) are configured to reduce discontinuity, reduce insertion loss, reduce reflection, reduce signal-to-noise ratio, reduce gain ripple, and/or increase flux density (e.g., in the direction that the conductor 102 is offset) in conveying the at least one energy packet using the micro-strip compared to the conductor being at the center of the coaxial transmission line the connector couples the conductor to the micro-strip.

In some examples, at least a portion of the micro-strip is separated from the ground plane by a dielectric material. In some examples, at least a portion of the micro-strip runs along a printed circuit board (PCB).

Figure 9:
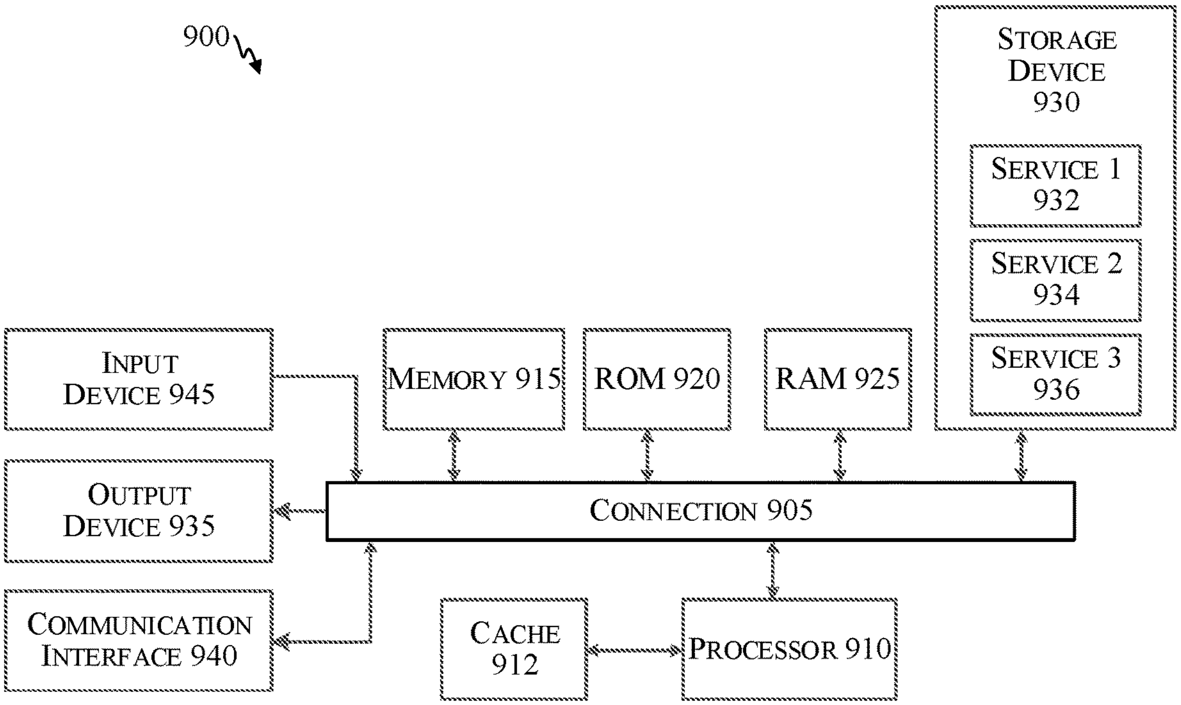
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device. The computing system 900 can, for instance, include the micro-strip 502, the plurality of micro-strips 512, and/or the LNA 514. The computing system 900 can, for instance, receive power and/or signals from the micro-strip 502, the plurality of micro-strips 512, and/or the LNA 514. The components of the computing system 900 are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In this description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A system for coupling a coaxial transmission line with a micro-strip, the system comprising:

the coaxial transmission line that includes a shield that surrounds a conductor across a first length of the coaxial transmission line and across a second length of the coaxial transmission line, wherein a cross-section of an interior of the coaxial transmission line within the shield has a first shape across the first length of the coaxial transmission line, wherein the cross-section of the interior of the coaxial transmission line within the shield has a second shape across the second length of the coaxial transmission line, wherein the second shape is different from the first shape, wherein the second shape is a semicircular shape, wherein a dielectric substance surrounds the conductor between the conductor and the shield across the second length of the coaxial transmission line, and wherein the conductor is offset from a central axis of the coaxial transmission line within at least a portion of at least the second length of the coaxial transmission line;

a connector that couples the micro-strip to the conductor of the coaxial transmission line, wherein the second length of the coaxial transmission line is between the connector and the first length of the coaxial transmission line; and the micro-strip that is coupled to a low-noise amplifier (LNA), wherein electromagnetic field lines corresponding to the coaxial transmission line flow into the micro-strip to convey at least one energy packet through the micro-strip and to the LNA.

2. The system of claim 1, wherein the connector includes gold, and wherein the conductor includes a conductive material other than gold.

3. The system of claim 1, wherein, within at least the portion of at least the second length, the conductor is offset from the central axis of the coaxial transmission line toward a ground plane.

4. The system of claim 1, wherein, within at least the portion of at least the second length, the electromagnetic field lines of the coaxial transmission line are concentrated toward a ground plane to simulate second electromagnetic field lines of the micro-strip.

5. The system of claim 1, wherein the conductor is offset from the central axis of the coaxial transmission line in a direction within at least the portion of at least the second length, wherein the electromagnetic field lines corresponding to the coaxial transmission line are concentrated in the direction within at least the portion of at least the second length, and wherein second electromagnetic field lines corresponding to the micro-strip are concentrated in the direction.

6. The system of claim 1, wherein the conductor runs along the central axis of the coaxial transmission line within at least a portion of at least the first length of the coaxial transmission line, and wherein the coaxial transmission line transitions from the first length to the second length as the coaxial transmission line approaches the connector that couples the micro-strip to the conductor.

7. The system of claim 1, wherein the coaxial transmission line uses a first dielectric material in a first configuration, wherein at least a part of the first length of the coaxial transmission line uses the first configuration, wherein the coaxial transmission line uses a second dielectric material in a second configuration, wherein at least a part of the second length of the coaxial transmission line uses the second configuration, wherein the coaxial transmission line transitions from the first configuration to the second configuration as the coaxial transmission line approaches the connector that couples the micro-strip to the conductor.

8. The system of claim 1, wherein the first shape is a circular shape.

9. The system of claim 1, wherein the conductor being offset from the central axis of the coaxial transmission line within at least the portion of at least the second length reduces discontinuity in conveying the at least one energy packet compared to the conductor being centered along with the central axis.

10. The system of claim 1, wherein the conductor being offset from the central axis of the coaxial transmission line within at least the portion of at least the second length reduces insertion loss in conveying the at least one energy packet compared to the conductor being centered along with the central axis.

11. The system of claim 1, wherein the conductor being offset from the central axis of the coaxial transmission line within at least the portion of at least the second length reduces reflection in conveying of the at least one energy packet compared to the conductor being centered along with the central axis.

12. The system of claim 1, wherein the conductor being offset from the central axis of the coaxial transmission line within at least the portion of at least the second length reduces a noise level affecting at least one signal associated with the at least one energy packet compared to the conductor being centered along with the central axis.

13. The system of claim 1, wherein the conductor being offset from the central axis of the coaxial transmission line within at least the portion of at least the second length reduces gain ripple in conveying of the at least one energy packet compared to the conductor being centered along with the central axis.

14. The system of claim 1, wherein at least a portion of the micro-strip is separated from a ground plane by a dielectric material.

15. The system of claim 1, wherein at least a portion of the micro-strip runs along a printed circuit board (PCB).

16. A method for coupling a coaxial transmission line with a micro-strip, the method comprising:

offsetting a conductor from a central axis of the coaxial transmission line within at least a portion of at least a second length of the coaxial transmission line, wherein the coaxial transmission line that includes a shield that surrounds the conductor across a first length of the coaxial transmission line and across the second length of the coaxial transmission line, wherein a cross-section of an interior of the coaxial transmission line within the shield has a first shape across the first length of the coaxial transmission line, wherein the cross-section of the interior of the coaxial transmission line within the shield has a second shape across the second length of the coaxial transmission line, wherein the second shape is different from the first shape, wherein the second shape is a semicircular shape, and wherein a dielectric substance surrounds the conductor between the conductor and the shield across the second length of the coaxial transmission line; and coupling the micro-strip to the conductor using a connector, wherein the second length of the coaxial transmission line is between the connector and the first length of the coaxial transmission line, wherein the micro-strip is coupled to a low-noise amplifier (LNA), wherein electromagnetic field lines corresponding to the conductor flow into the micro-strip to convey at least one energy packet through the micro-strip and to the LNA.

17. The method of claim 16, wherein the connector includes gold, and wherein the conductor includes a conductive material other than gold.

18. The method of claim 16, wherein, within at least the portion of at least the second length, the conductor is offset from the central axis of the coaxial transmission line toward a ground plane.

19. The method of claim 16, wherein the conductor is offset from the central axis of the coaxial transmission line in a direction within at least the portion of at least the second length, wherein the electromagnetic field lines corresponding to the coaxial transmission line are concentrated in the direction within at least the portion of at least the second length, and wherein second electromagnetic field lines corresponding to the micro-strip are concentrated in the direction.

20. The method of claim 16, wherein the first shape is a circular.

* * * * *